United States Patent [19]
Blossom

[11] Patent Number: 6,084,958
[45] Date of Patent: Jul. 4, 2000

[54] DETERMINING THE MANNER IN WHICH THE WIRES CONNECTING TO A BASE SET OF A TELEPHONE SYSTEM ARE USED FOR TRANSMISSION AND RECEPTION OF ELECTRICAL SIGNALS REPRESENTING A COMMUNICATION

[75] Inventor: Eric Arden Blossom, Monterey, Calif.

[73] Assignee: Starium Ltd, Monterey, Calif.

[21] Appl. No.: 09/103,360

[22] Filed: Jun. 23, 1998

[51] Int. Cl.[7] ................................................. H04M 1/00
[52] U.S. Cl. ........................ 379/352; 379/387; 379/389; 379/390; 379/404
[58] Field of Search ..................................... 379/387, 395, 379/404, 392, 1, 6, 441, 399, 442; 324/628, 126, 130; 380/9, 18, 41; 381/58, 104

[56] References Cited

U.S. PATENT DOCUMENTS

| | | | |
|---|---|---|---|
| 5,434,920 | 7/1995 | Cox et al. | 380/49 |
| 5,455,861 | 10/1995 | Faucher et al. | 380/9 |
| 5,473,244 | 12/1995 | Libove et al. | 324/126 |
| 5,629,926 | 5/1997 | Deutsch et al. | 370/359 |
| 5,729,603 | 3/1998 | Huddart et al. | 379/387 |
| 5,825,873 | 10/1998 | Duncan et al. | 379/419 |
| 5,892,823 | 4/1999 | Stelman | 379/387 |

*Primary Examiner*—Forester W. Isen
*Assistant Examiner*—Jacques Saint-Surin
*Attorney, Agent, or Firm*—Law Firm of Naren Thappeta

[57] ABSTRACT

A device connected to a base of a telephone system by four wires. The device determines the manner in which the wires are used during transmission and reception of electrical signals representing communications. A user places the telephone system in a receive-only mode and provides an indication to the device. The device examines the wires to determine which of the two wires are being used for reception, and the voltage level which is used for receiving the signals. The remaining two wires are deemed to be used for transmission of electrical signals. Communication may be established with an external calibration system to calibrate the transmission and receive voltage levels. The determined information can be used in several environments such as for secure communication for voice and data.

6 Claims, 4 Drawing Sheets

DETERMINING THE MANNER IN WHICH THE WIRES CONNECTING TO A BASE SET OF A TELEPHONE SYSTEM ARE USED FOR TRANSMISSION AND RECEPTION OF ELECTRICAL SIGNALS REPRESENTING A COMMUNICATION

BACKGROUND OF THE INVENTION

1. Field of the Invention

The present invention relates to telecommunication systems, and more specifically to a method and apparatus for conveniently determining the manner in which the wires connecting to a base set of a telephone system are used for transmission and reception of electrical signals representing a communication.

2. Related Art

Figure 1:
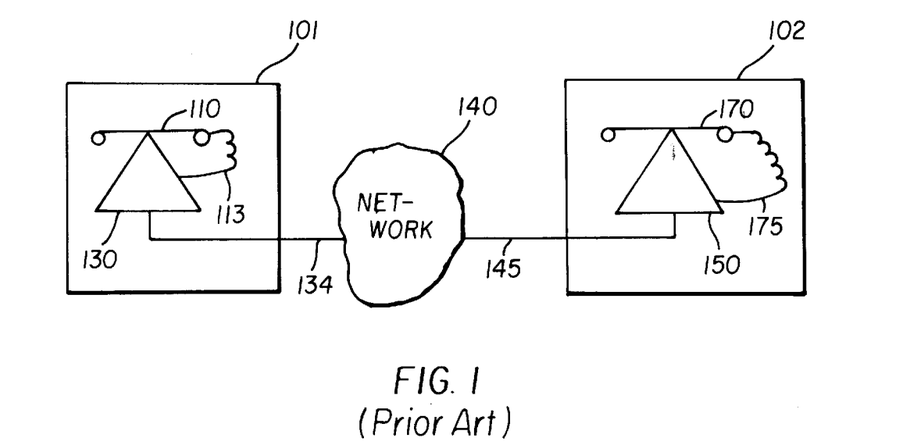
FIG. 1 is a block diagram of two telephone systems connected by a network illustrating the some of the problems addressed by the present invention.

Telephone systems are generally used for communication between users or machines as is well known in the arts. FIG. 1 depicts an example environment including telephone systems 101 and 102, which enable communication between two users. Telephone system 101 is connected to telephone system 102 by network 140. Telephone system 101 includes hand set 110 connected to base set 130 by wires 113, and telephone system 102 includes hand-set 170 connected to base 150 by wires 175. Users may use parts such as head sets instead of handsets while communicating with other uses. Parts such as hand-sets or head sets of a telephone system which are used by users for communication are referred to as user sets in the present application.

Network 140 may include one or more of PBXs, private networks, public networks and the like implemented in a combination of analog and/or digital transmission technologies as is well known in the relevant arts. Network 140 transfers signals between bases 130 and 150 to enable communication between users using hand sets 110 and 170.

In operation, in response to the voice of a user, hand set 110 generates electrical signals on wires 113. The voltage levels of the electrical signals on wires 113 generally represent the voice communication. In response to the voltage levels on wires 113, base set 130 generates transmission signals on line 113 according to a predefined interface protocol. Network 140 receives these transmission signals and delivers the signals to base set 150 also according to potentially a different pre-defined interface. Base set 150 converts the received signals to electrical signals, and transmits the electrical signals on wires 175 to hand set 170. The voltage levels of these electrical signals also generally represent the voice of the user of telephone system 101. The communication in the reverse direction from telephone system 102 to telephone system 101 is similarly described.

There are several situations in which it may be desirable to determine the voltage levels used on the wires 113 and 175 for representing voice communication. For example, the voice communication between telephone systems 101 and 102 of FIG. 1 may not be secure in the sense that an unknown third-party may be able to monitor and decipher (or modify) the communication anywhere between the two bases 130 and 150. Accordingly, one may wish to encrypt the communication for security.

One may further wish to encrypt the electrical signals on wires 113 between hand set 110 and base 130 as the encryption scheme can then be used in conjunction with bases which operate in both digital and analog modes. To clarify with an illustration, bases are typically designed to generate digital signals on line 134 when implemented for operation generally with private branch exchanges (PBXs), and are designed to generate analog signals on line 134 when implemented typically for operation directly with public switched telephone networks. In either case, the communication on wires 113 usually include analog electrical signals. For the encryption scheme to operate in both cases, one may wish to encrypt the communication by modifying the electrical signals on wires 113.

Encryption generally entails examining the electrical signals generated by hand set 110 and generating new electrical signals with different signal characteristics. The alteration of the characteristics makes it harder for one to decipher the communication represented by the electrical signals. The generation of new electrical signals generally requires a determination of the voltage levels of electrical signals received by base 130 such that the new signals generated can conform to the voltage levels with which base 130 is designed to operate. Therefore, it may be desirable to determine the voltage levels at which base 130 is designed to receive electrical signals.

When the encrypted signals are received by telephone system 102, the encrypted signals need to be decrypted such that sounds transmitted at hand set 110 can be reproduced at hand set 170. The decryption may also be performed between hand set 170 and base 150. The decryption processes may need to be implemented using the voltage levels of electrical signals generally used by base 150 in transmitting on wires 175. Accordingly, it may be necessary to determine the voltage levels used on wires 175 while electrical signals representing voice are being received.

Even though the need for determining voltage levels has been described with reference to transmission of voice signals from telephone system 101 to telephone system 102, it should be understood that the voltage levels may need to be determined while voice signals are transmitted in the reverse direction from telephone system 102 to telephone system 101.

Thus, there is a general need to determine the voltage levels used on wires connecting to telephone base sets at least while encrypting the communication signals.

In addition to determining the voltage levels, it may be necessary to determine the specific wires in 113 which are used for transmission, and which are used for reception. This need may be appreciated by considering a typical configuration in which four wires are present between each base and the corresponding user set. Two ("pair") of these wires are used for transferring of electrical signals in one direction (e.g, transmission) while the other two wires are used for transferring electrical signals in the other direction (reception). In general, there is no uniform convention as to which of the two pairs is used for transmission and which pair is used for receiving. Accordingly, it may be problematic to conveniently detect which wires are used for transmission and which wires are used for reception.

Several devices exist in areas such as telephone head-sets, in which a device is placed in the middle of wires 113. Due to the inability to meet one or more of the requirements noted above, users are generally required to perform manual configurations (such as setting switches) to enable the device to determine various parameters such as voltage levels and the precise wires which may be used for the transmission and reception of electrical signals representing voice communications. Unfortunately, manual configurations are undesirable in some situations at least for the reasons that they may be error prone and time consuming.

Accordingly, what is needed is a method and apparatus for conveniently detecting the various configuration parameters such as voltage levels used on wires connecting to a telephone base. The method and apparatus may also need to meet the requirements of any encryption technologies with which it may be implemented.

SUMMARY OF THE INVENTION

The present invention is directed to a device which is connected to a base of a telephone system by a plurality of wires. The device can conveniently determine the specific wires used for transmission and reception of electrical signals representing (voice or data) communications, and the voltage levels used in the representation. When representing voice communications, the device may be connected to a user set (head set or hand set) on one side and a base set on the other.

A telephone system may need to be placed in a receive-only mode by, for example, keeping the hand-set off of the base. In a receive-only mode, the receive electrical signals are substantially more dominant than any transmission signals. An indication (e.g., user presses a button) is provided to the device of the present invention that the telephone system is in the receive-only mode.

In response, a configuration determination block located in the device examines the wires connecting to the base to determine which of the wires ("receive pair") are being used during the reception mode. As the base is connected is typically connected to the device by four wires, the two wires ("transmission pair") other than the wires in the receive pair are deemed to be used for transmission.

Once the receive and transmission pairs are determined, communication may be established with an external calibration system according to an aspect of the present invention. The device sends electrical signals with very low voltage levels initially on the transmission pair. The calibration device is designed to provide indications over the receive pair that the voltage levels can be increased or decreased. Using the increase or decrease indications, the device of the present invention can calibrate the transmission voltage level. The increase and decrease indications can be represented by different frequencies of the signals transmitted from the calibration system.

By starting with a low voltage level, the present invention ensures that the power generated on a network connecting the calibration device to the telephone system does not exceed any regulatory limits.

Using the communication with the calibration system, the maximum voltage level used for reception can also be calibrated. For example, the calibration system may be designed to generate signals using maximum power levels permitted on the network, and the electrical signals received in response can be used to calibrate the maximum receive voltage level.

A device in accordance with the present invention can be used in several environments. For example, encryption and decryption blocks may be integrated into the device to provide secure voice communication between users at two telephone systems. Similarly, the device may also be used integrated with a modem which transmits digital data in the form of electrical signals having the format of voice signals.

Thus, the present invention provides a convenient mechanism to determine the manner in which the wires connecting a base are used for transmission and reception. The convenience is achieved due to the simple and limited number of tasks a user may need to perform.

The present invention conveniently determines the receive wire pair by examining all the wires when the telephone system is placed in a receive-only mode.

The present invention conveniently determines which of the wires are used for transmission as the base sets typically use only four wires, and the two wires other than the receive wires form the transmission wires.

The present invention conveniently determines the maximum reception voltage as an external calibration device is used to calibrate the receive and transmission voltages. As the external calibration device can be shared with several telephone systems, the overall solution may be cost-effective also.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Present Invention

The present invention is described in the context of a cryptography device located between a hand set and a base of a telephone system. In accordance with the present invention, a user places the telephone system in a receive-only state and provides an indication that the telephone system is in the receive-only state. A receive only state generally refers to a state when the strength of electrical signals is a lot more pre-dominant in a receive direction than in a send direction such that the wires being used for reception can be detected.

Upon receiving the indication, the wire pair used for receiving electrical signals can be determined by examining all the wires. The voltage levels used for the reception may also be determined by measuring the voltage level on the determined pair of wires. The wire pair used for transmission can also be determined as the cryptography device is connected to the base by only four wires. Connection may then be established with an external system, which enables the voltage levels used for transmission and reception to be calibrated more accurately.

Thus, it may be appreciated that the various configuration parameters (voltage levels, parameters, wire-pair used for sending etc.) can be determined conveniently with limited user-intervention. Accordingly, the present invention is suited for use in environments in which less user-intervention is desirable.

Before describing the invention in great detail, it is useful to describe an example environment in which the invention can be implemented. The manner in which various configuration parameters can be determined in accordance with the present invention is then described.

2. Example Environment

In a broad sense, the invention can be implemented in conjunction with any base sets. The base sets are typically connected to user sets such as hand sets and head sets (user sets). A base set may however be connected to any device (such as modems) which generates electrical signals in a format compatible with those generated by user sets. The present invention enables some of the parameters of these format to be determined conveniently.

Figure 2:
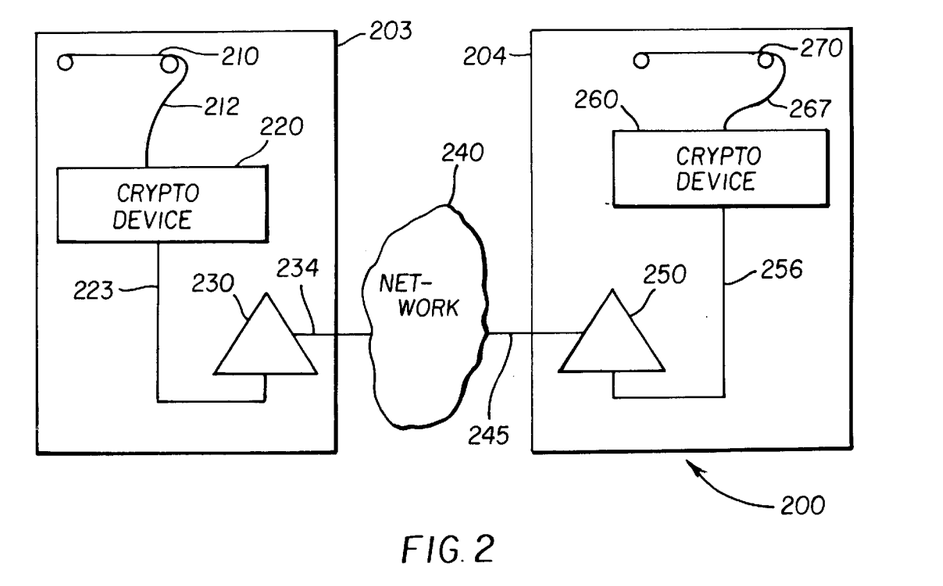
FIG. 2 is a block diagram illustrating an example environment in which the present invention can be used.

FIG. 2 is a block diagram illustrating an example communications system 200 in which the present invention can be implemented. Secure communication is provided between telephone systems 203 and 204 by using cryptography devices 220 and 260. Cryptography devices 220 and 260 may determine various configuration parameters such that the devices can be inserted between a corresponding base and user set combination without requiring substantial user intervention (or manual configuration by users).

Telephone system 203 includes hand set 210 and base 230 connected to cryptography device 220 by multi-conductor cables 212 and 223 respectively. Similarly, telephone system 204 includes hand set 270 and base 250 connected by multi-conductor cables 267 and 256 respectively. Multi-conductor cables 212, 223, 256 and 267 may each include two pairs of wires, and can be implemented using standard modular telephone hand-set chords available in the market place. One pair of wires is used for transmission of electrical signals and the other pair is used for receiving electrical signals.

Base 230 needs to be implemented to send and receive signals on line 234 according to a protocol compatible with an interface at network 240. Similarly, base 250 needs to be implemented to send and receive signals on line 245 also according to a compatible protocol. The protocols on lines 234 and 245 can be different. For example, line 234 may correspond to a local loop connecting to a central office and support analog mode of transmission. Line 235 may be implemented using digital mode of transmission and interface with a PBX in network 240. Bases 230 and 250, and network 240 can be conventional. The present invention enables convenient usage of cryptography devices 220 and 260 with such conventional components also as described in further detail below.

Cryptography devices 220 and 260 are described with general reference to cryptography device 220 for conciseness. The description may be applicable to cryptography device 260 as well. Also, for conciseness, cryptography is described in the context of transferring signals from telephone system 203 to telephone system 204. However, the description is applicable to the reverse direction also as will be apparent to one skilled in the relevant arts.

Cryptography device 220 may operate in two modes: non-secure mode and secure mode. While operating in a non-secure mode, the electrical signals received on multi-conductor cables 223 and 212 are generally passed to the other side (212 and 223 respectively) without modification as if multi-conductor cables 212 and 223 are connected directly. When operating in secure mode, cryptography device 220 encrypts the communication represented by electrical signals ("original electrical signals") received on multi-conductor cable 212 by modifying the electrical signals.

Encryption may be performed in one of several ways. For example, the electrical signals may be digitized for processing according to various digital encryption techniques. In an embodiment, encryption is performed according to the techniques described in a book entitled, "Applied Cryptography 2nd Ed.", Bruce Schneier, ISBN Number: 0-471-11709-9, which is incorporated in its entirety into the present application. Only the details of cryptography as may be applicable to an understanding of the present invention are described here. For a detailed understanding of cryptography, the reader is referred to the same book.

In general, cryptography device 220 generates new electrical signals on multi-conductor cable 223 which differ in electrical characteristics from the original electrical signals received on multi-conductor cable 212. However, the generated new signals typically need to be at least approximately within a range of voltage levels with which base 230 is designed to operate with.

The present invention enables the voltage levels to be determined conveniently such that the new electrical signals can be generated within an acceptable voltage range while transmitting, and can be interpreted properly during reception. In accordance with other aspects of the present invention, cryptography device 220 can further determine which wire pair in wire-multi-conductor cables 212 and 223 is used for sending and which wire pair is used for receiving. The manner in which these features can be accomplished is described first with reference to a method and then with reference to a circuit which implements the method.

3. Method of the Present Invention

Figure 3:
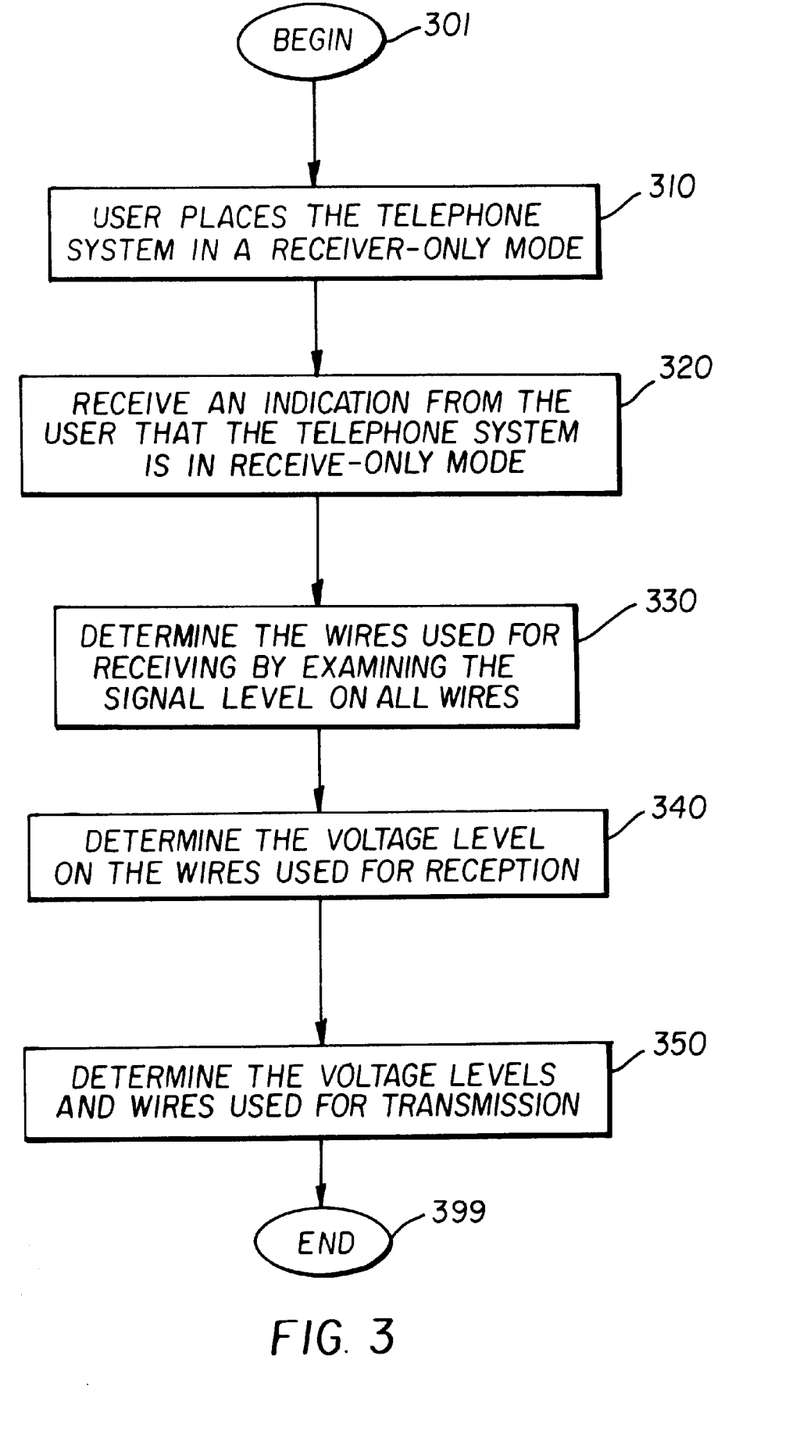
FIG. 3 is a flow-chart illustrating a method according to the present invention.

FIG. 3 is a flow-chart illustrating a method according to the present invention. The steps in the flow-chart are described with reference to FIG. 2 for clarity. In step 310, a user places telephone system 203 in a receive-only mode. As noted above, in a receive-only mode the strength of electrical signals representing reception are a lot more dominant than electrical signals used for transmission. Thus, a telephone system can be placed in a receive-only mode by, for example, lifting hand set 210 off of base 230 in typical telephone systems. Telephone systems can be placed in receive-only mode in other ways depending on the specific design. For example, in many telephone systems including speakers, a button may be pressed to turn the speaker phone option on and get a dial-tone.

Placing hand set 210 in a receive-only mode generally causes base 230 to generate a dial-tone on a receive wire pair of multi-conductor cable 223. In step 320, the user provides an indication that telephone system 203 is in a receive mode. The indication may be provided, for example, by pressing a button (not shown in Figures) provided on cryptography device 220.

In step 330, cryptography device 220 examines each of the wires in multi-conductor cable 223 upon receiving the indication of step 320. Based on the examination, a determination is made as to which two wires have active electrical signals in step 330. The determined pair ("receive pair") is deemed to be used for receiving electrical signals. In step 340, the voltage level on the receive pair is measured. Step 340 can be performed in a known way.

In step 350, the configuration (specif wires and voltage levels) for transmitting electrical signals is determined. The task is simplified in case of multi-conductor cables 212 and 223 which have only four wires each, as the two wires other than the receive pair may be deemed to be the "transmit pair". The transmit voltage level can be determined in one of several ways. For example, the user may be asked to speak into the micro-phone of hand set 210 to determine the approximate voltage level used for transmitting electrical signals. However, this method may not be accurate enough as users may speak at varying levels of sound volume.

In the alternative or in addition, a connection may be established with an external system using which the transmission configuration can be determined. The external connection is established preferably by having a user dial a telephone number, with a calibration system at the called telephone number. In the alternative, dual-tone-multiple-frequency (DTMF) signals can be generated automatically from the cryptography device 220. The calibration system then communicates with telephone system 203 to calibrate the voltage levels as described in further detail below.

The receive and send voltage levels may be calibrated in any arbitrary order. In an embodiment, the receive voltage may be calibrated first. To calibrate the receive voltage level at cryptography device 240, the calibration system may be designed to generate transmission signals at maximum power levels permitted on network 240. Cryptography device 220 may be designed to adjust the monitor the received voltage levels to determine the maximum levels at which electrical signals may be received.

Cryptography device 220 may then start generating electrical signals at a fairly low voltage level on the transmit pair in multi-conductor cable 223. Starting at a low voltage level prevents transmission signals at a power level greater than that permitted on public switched networks. The calibration system at the other end of the communication may be designed to generate different signals (e.g., by using different frequencies) to indicate whether the voltage level needs to be increased or decreased.

In response to the received signals, the transmit voltage levels may be accordingly modified until an appropriate maximum voltage is determined in conjunction with the calibration system. The implementation of such communication between a calibration system and cryptography device 220 for calibration will be apparent to one skilled in the relevant arts at least by reading the description herein.

Therefore, the voltage levels used from and to base 230 can be determined without requiring extensive user intervention as described above with reference to the method of FIG. 3. A circuit for implementing the method is described below in greater detail.

4. A Circuit in Accordance with the Present Invention

Figure 4:
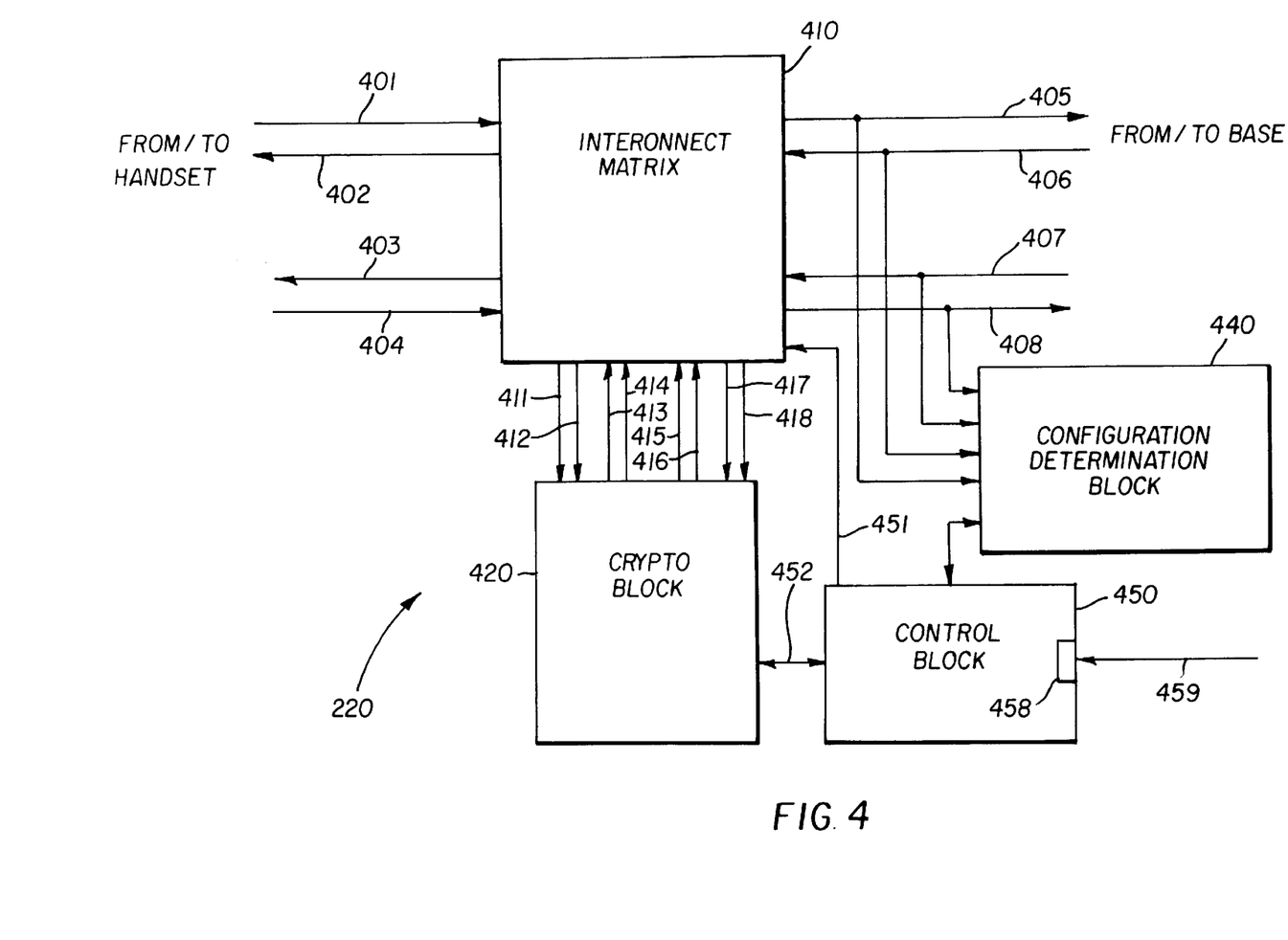
FIG. 4 is a block diagram illustrating an embodiment for determining the manner in which wires are used for communication with a base in accordance with the present invention.

A circuit in accordance with the present invention can be implemented within cryptography device 220 as illustrated with reference to FIG. 4. Cryptography device 220 includes interconnect matrix 410, cryptography block 420, configuration determination block 440, and control block 450. Each of these components is described in further detail below.

Configuration determination block 440 determines which of the wires 405–408 from base are used for reception and which of the wires are used for transmission. As described in further detail above with reference to FIG. 3, a user may be required to place the telephone system in a receive-only mode, and configuration determination block 440 may examine wires 405–408 to determine which pair of wires is used for reception. The user may indicate that the telephone system is in receive-only mode by, for example, pressing a button (not shown in Figures), and a signal may be generated by signal receiver block 458 on line 459 in response. Therefore, when signal receiver 458 receives a signal, control block 450 may cause configuration determination block 440 to examine wires 405–408. Even though signal receiver 458 is shown with in control block 450, it should be understood that signal receiver may be provided in other blocks. Signal receiver 458 can be implemented in a combination of one or more of hardware, software, firmware and the like.

Upon a determination of the pair of wires used for receiving, configuration determination block 440 may measure the voltage level used during reception. However, if cryptography block 420 has the necessary logic blocks to measure the voltage, configuration determination block 440 may communicate which wires are determined to be used for receiving to control block 450, which may configure cross-connect matrix 410 to connect these wires to lines 417 and 418. Cryptography block 420 may then measure the receive voltage levels. As cryptography block 420 generally includes the logic blocks for measuring voltage levels during secure communication, the measurement may be performed in cryptography block 420.

In the alternative, configuration determination block 440 may include the relevant logic to measure the voltage levels. A signal voltage sensor having high-impedance inputs and available in the market place can be used to measure the voltage levels as is well known in the relevant arts. In either case, a block implemented in a combination of one or more of hardware, software, firmware and the like, for measuring the voltage levels may be termed as a measurement block.

Configuration determination block 440 may further determine the transmission parameters (voltages and wires) and calibrate the transmission and receive voltages by communicating with an external calibration system as described with reference to step 350 of FIG. 3. Thus, configuration determination block 440 can be used to determine the manner in which the wires connecting to a base of a telephone system are used for transmission and reception.

Control block 450 generates the control signals to coordinate and control the operation of the other blocks. Control block 450 may receive an indication as to which of the wires 405 408 are used for transmission and reception, and generate control signals on line 451 to configure cross-connect matrix 410 in a desired manner. If configuration determination block 440 computes the receive and transmit voltages, control block may communicate the same to cryptography block 420. Control block 450 may generate other signals to configuration determination block 440 while determining and calibrating the transmission and receive voltages. The implementation of control block 450 will be apparent to one skilled in the relevant arts by reading the description herein.

Cross-connect matrix 410 is connected to wires 401–408, of which 401–404 connect to hand set and 405–408 connect to base. Accordingly, wires 401–404 and 405–408 are generally included in multi-conductor cables 212 and 223 respectively. As noted above, a fixed convention may not exist across the industry as to which of the wires can be used for transmission and which wires can be used for reception. For illustration, it is assumed that wires 405 and 408 (and corresponding wires 401 and 401) are used for transmission, and wires 406 and 407 (and corresponding wires 402 and 403) are used for reception. The manner in which such a determination can be made is described above.

Cross-connect matrix 410 operates under the control of control block 450 to ensure that receive signals received from base are provided on lines 417 and 418 irrespective of which wires in multi-conductor cable 223 the signals are received on. Similarly, cross-connect matrix 410 ensures that wires 402 and 403 receive the signals corresponding to the reception. In summary, as to reception of signals in a telephone system, the signals of wires 406 and 407 are received by cryptography block 420 on lines 417 and 418, and the same signals (in non-secure mode) or new signals (in secure mode) are sent via lines 413 and 414 to lines 402 and 403. As to transmission, the path is from wires 401 and 404 to cryptography block 420 via lines 411 and 412, and from cryptography block 420 to wires 405 and 408 via lines 415 and 416. In other words, cross-connect matrix 410 enables cryptography block 420 to operate using predetermined lines for transmission and reception. Cross-connect matrix 410 can be implemented in a known way, for example, as an array of relays.

Cryptography block 420 uses the determined configuration information in encrypting and decrypting the electrical signals. For example, the transmission voltage may be used for encryption and the reception voltage may be used for decryption. However, the manner in which these voltage levels can be used depends on the specific encryption technologies chosen. An example implementation of cryptography block 420 is described below with reference to FIG. 5.

5. Cryptography block

An example implementation of cryptography block 420 is described with reference to FIG. 5. The manner in which the voltages determined above can be used is also illustrated with reference to the Figure. Control block 450 may provide the bias control inputs on bus 452. The voltage levels can be used in other ways also depending on different design choices and the specific encryption technology chosen. Cryptography block 420 is shown including two blocks, receive block 501 and transmission block 502. The details of both blocks are described below.

As to reception block 501, the voltage level of electrical signals received on lines 417 and 418 is scaled to fit into a range supported by analog-to-digital converter (ADC) 560. The amplification in gain control 560 may be determined by the receive voltage determined in accordance of the present invention. The amplified signal is provides as an input to ADC 570, which generates digital samples of the received input. The digital samples are provided to decryption block, which performs decryption by processing the digital samples. The decryption needs to be generally compatible with the encryption performed on the end of the communication.

Once decrypted, the resulting digital data is provided to digital-to-analog converter (DAC) 580, which generates electrical analog signals. The electrical analog signals are again amplified by gain control 590 to generate electrical signals in a range hand set 210 is designed to operate with. Also, the digital samples generated by ADC 570 represent the voltage level of the received electrical signals. Accordingly, the samples may be examined to determine the receive voltage levels.

As to transmission block 502, electrical signals representing voice are received on lines 411 and 412. Gain control 510 amplifies the electrical signals to be within a range supported by ADC 520. The digital samples generated by ADC 520 are processed by encryption block 530 according to an encryption scheme. An embodiment of cryptography block 420 uses the data encryption standards described in "Federal Information Standard: 46-2", which is incorporated in its entirety herewith. The encrypted data is provided to DAC 540. The electrical signals generated by DAC 540 are amplified by gain control 550 to generally be within the transmission voltage level determined above. The amplified electrical signals are generated on wires 415 and 416.

Thus, secure communications can be implemented using the configuration information determined in accordance with several aspects of the present invention. The above-described embodiments are described primarily in the context of processing voice communications. However, it should be understood that the present invention can be implemented in several other environments as will be apparent to one skilled in the relevant arts by reading the description herein. Such implementations are contemplated to be within the scope and spirit of the present invention. Some such example implementations are described briefly below.

6. Application of the Present Invention in Other Environments

Figure 5:
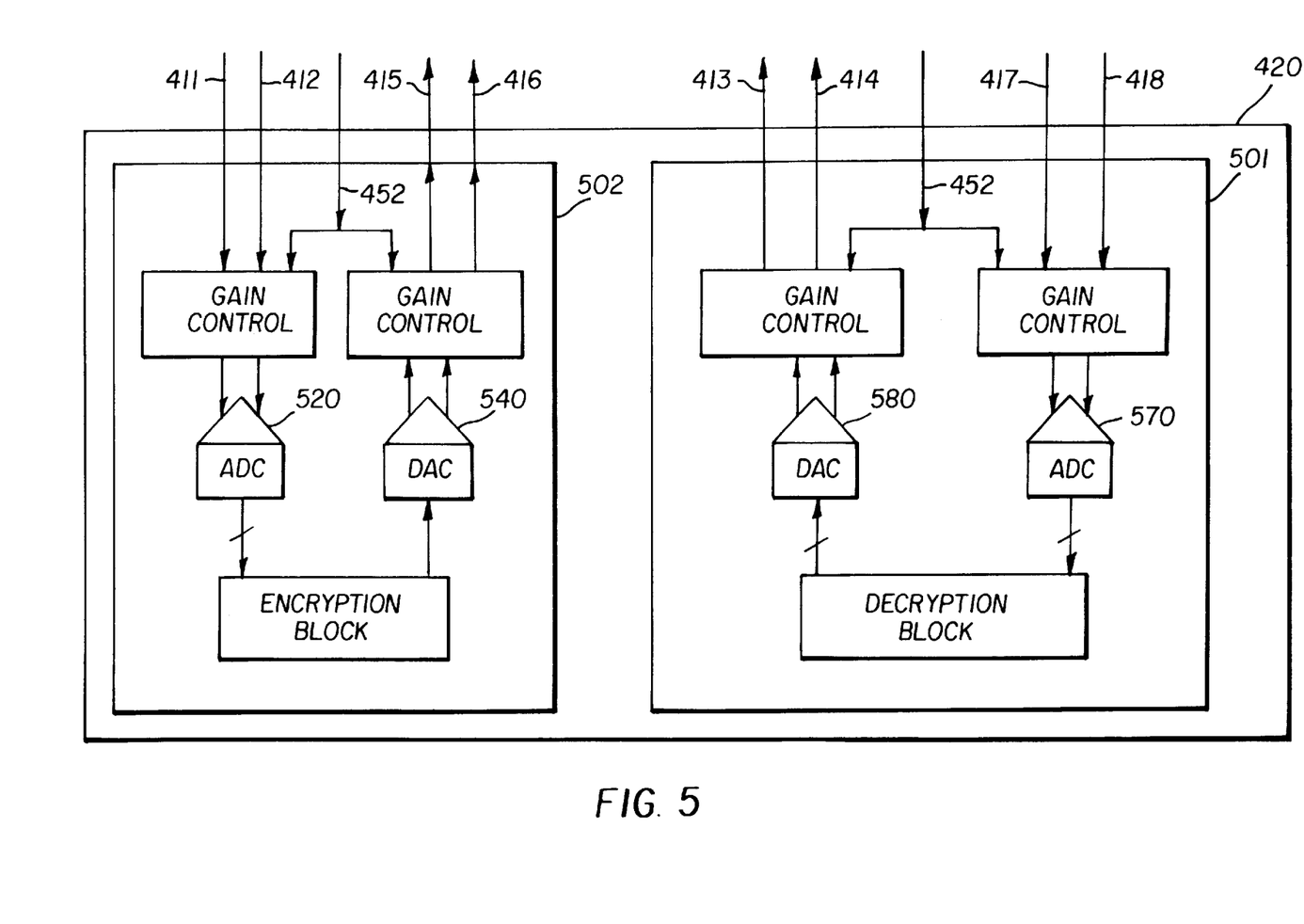
FIG. 5 is a block diagram of a cryptography block illustrating an example embodiment in which the transmission and received voltages determined in accordance with the present invention can be used.

The embodiment of FIG. 5 can be extended to support digital data communications. On other words, the modified embodiment may operate as a modem. In the modified embodiment, ADCs 520 and 580, and gain controls 510 and 590 which interface with the handset may not be needed. The digital data which needs to be transmitted may be provided as an input to DAC 540 during transmission or encrypted by encryption block 530 before being provided as an input to DAC 540.

Similarly, during reception, the output of ADC 570 may constitute the received data during non-secure reception, and the output of decryption block 535 may constitute the received data during secure reception. ADCs may be implemented using part number ADC08038 (8-bit High-Speed Serial I/O ADC) available from National Semiconductor Corporation, CA, USA.

From the above it should be appreciated that the present invention can be applied in conjunction with any devices such as data modems, fax machines, head-sets which can transmit signals compatible with base sets of telephone systems. In any of such implementations, the manner in which the wires connecting to base sets can be determined conveniently in accordance with the present invention.

7. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A device connected to a base of a telephone system by four wires, said device for determining the manner in which said four wires are used for receiving and transmitting electrical signals representing a communication, said device comprising:

a signal receiver for receiving a signal indicating that said telephone system is placed in a receive only mode, wherein said telephone system is placed in said receive only mode when a hand-set comprised in said telephone system is taken off from said base, wherein said hand-set is placed on said base when not in use;

a configuration determination block coupled to said signal receiver for examining said four wires in response to the reception of said signal by said signal receiver, said configuration determination block determining a pair of receive wires used for receiving electrical signals from said base according on said examination, wherein said pair of receive wires are included in said four wires, said configuration determination block being designed to determine that the remaining two wires of said four wires comprise a pair of transmit wires for transmitting electrical signals to said base;

a receive gain control and a transmission gain control;

a measurement block for measuring voltage level on said pair of receive wires when said telephone system is in said receive only mode and adjusting the gain of said receive gain control; and a control block for communicating with a calibration system on a network, wherein said network is capable of connecting to many telephone systems, wherein said control block determines a transmission voltage level by communicating with said calibration system and adjusting the gain of said transmission gain control to determine an optimal transmission level to said base, said optimal transmission level being used to send signals to said base set, said control block increasing said transmission gain control in response to receiving a signal of a first frequency from said calibration system and decreasing said transmission gain control in response to receiving a signal of a second frequency, wherein said calibration system sends said signals with said first frequency and said second frequency based on the strength of the signals received from said control block.

2. The device of claim 1, wherein said measurement block is comprised in said configuration determination block.

3. The device of claim 1, wherein said control block is designed to send transmission electrical signals at a low voltage initially to said calibration system using said transmit pair such that the corresponding power level generated on said network does not exceed a predetermined maximum threshold, wherein said calibration system is designed to indicate that the voltage level of said transmission signals can be increased such that said control block can increase the voltage level, whereby said control block determines an appropriate maximum transmission power level.

4. The device of claim 1, wherein said calibration system is designed to send electrical signals at a maximum power level permitted by said network, wherein said control block determines a maximum receive voltage in response to receiving signals corresponding to said electrical signals by sent calibration system sent at said maximum transmission power level.

5. The device of claim 1, wherein said device is used for transmitting and receiving digital data represented as electrical signals.

6. A method of determining the manner in which four wires connecting a device to a base of a telephone system are used for receiving electrical signals representing a communication, said method comprising the steps of:

(a) placing said telephone system in a receive only mode by taking said hand-set off of said base;

(b) sending a signal indicating that said telephone system is placed in said receive only mode; and (c) examining said four wires in said device in response to the reception of said signal to determine a pair of receive wires used for receiving electrical signals in said receive only mode, wherein said pair of receive wires are included in said four wires;

(d) determining that the remaining two wires of said four wires comprise a pair of transmit wires for transmitting electrical signals to said base;

(e) measuring voltage level on said pair of receive wires when said telephone system is in said receive only mode to adjust a receive gain;

(f) establishing a connection with a calibration system on a network;

(g) sending signals to said calibration system;

(h) measuring the strength of the signals sent in step (g) at said calibration system;

(i) sending to said telephone system a signal of one frequency to indicate that the strength of the signal measured in step (h) is to be higher and a signal of another frequency to indicate that the strength of the signal measured in step (h) is to be lower; and (j) examining the signal sent in step (i) to adjust the transmit gain, wherein said transmit gain is increased if said signal of first frequency is received and said transmit gain is decreased if said signal of second frequency is received.

* * * * *